April 13, 1937.  M. WINTER  2,076,606

CARBURETOR

Filed Nov. 13, 1934  6 Sheets-Sheet 1

INVENTOR.

Martin Winter

BY James Harrison Bowen

ATTORNEY.

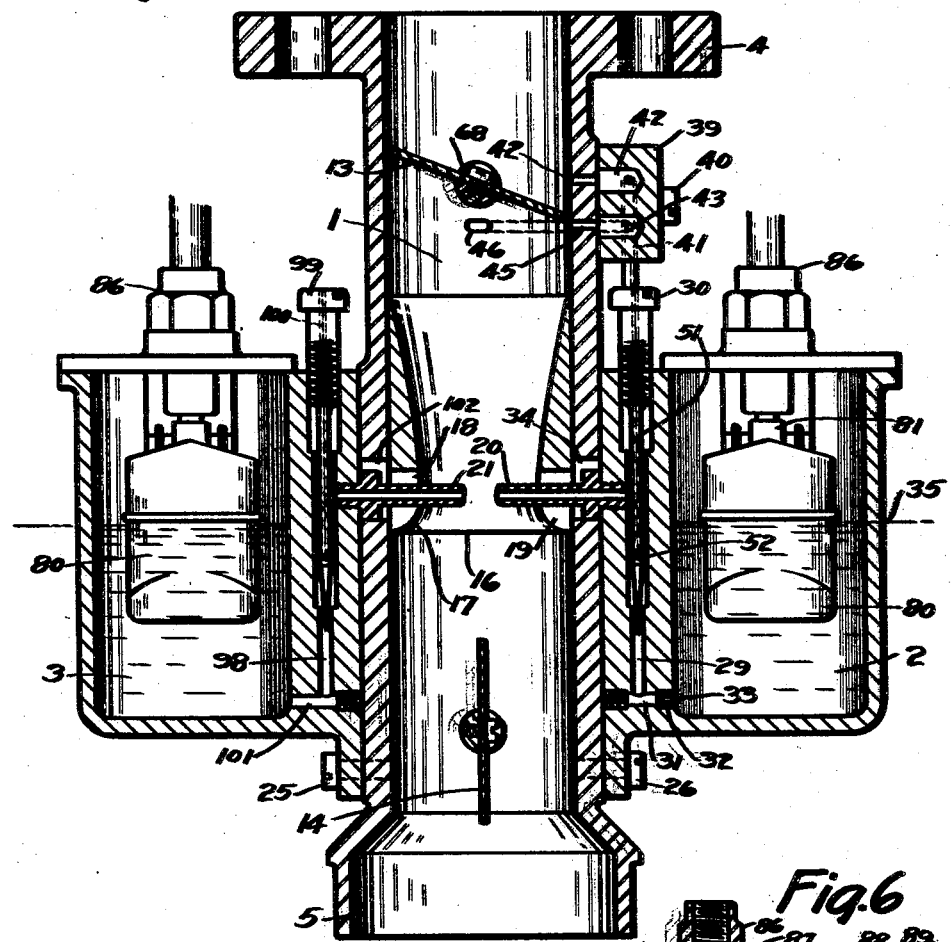
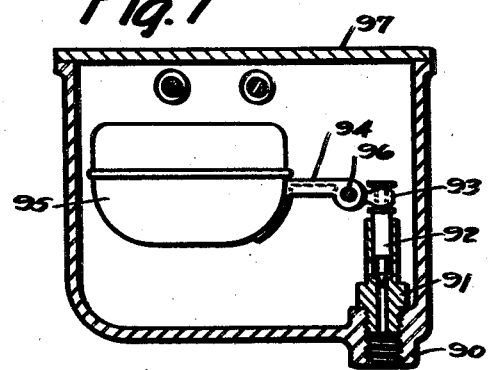
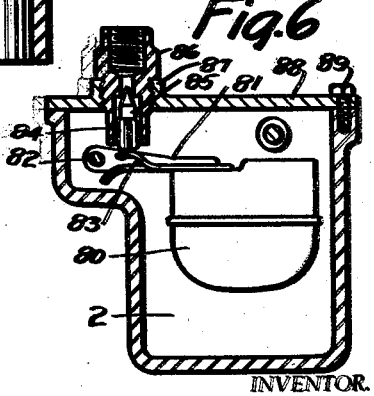

April 13, 1937. M. WINTER 2,076,606
CARBURETOR
Filed Nov. 13, 1934 6 Sheets-Sheet 3
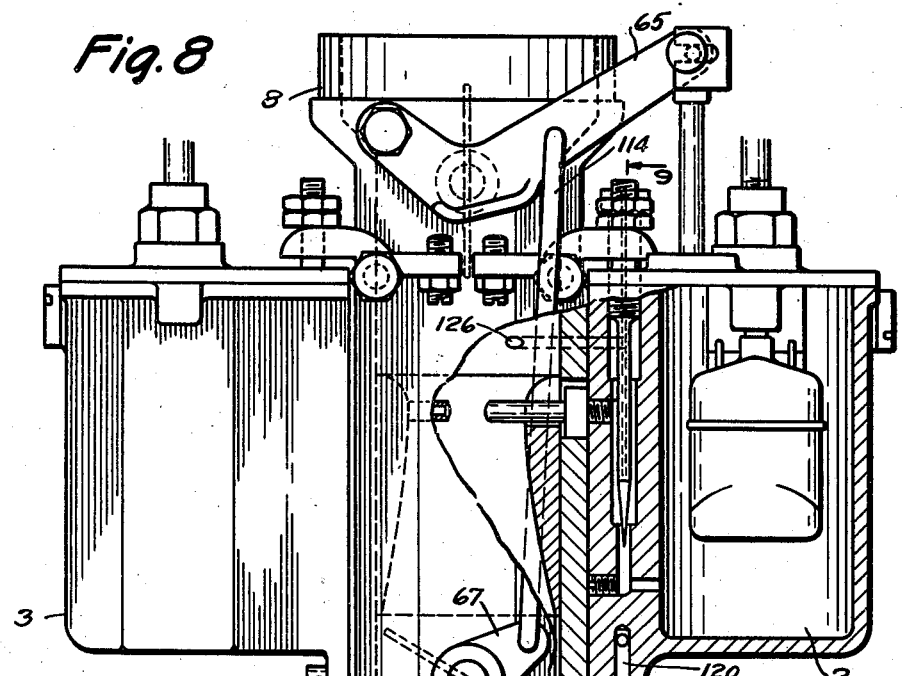
Fig. 8
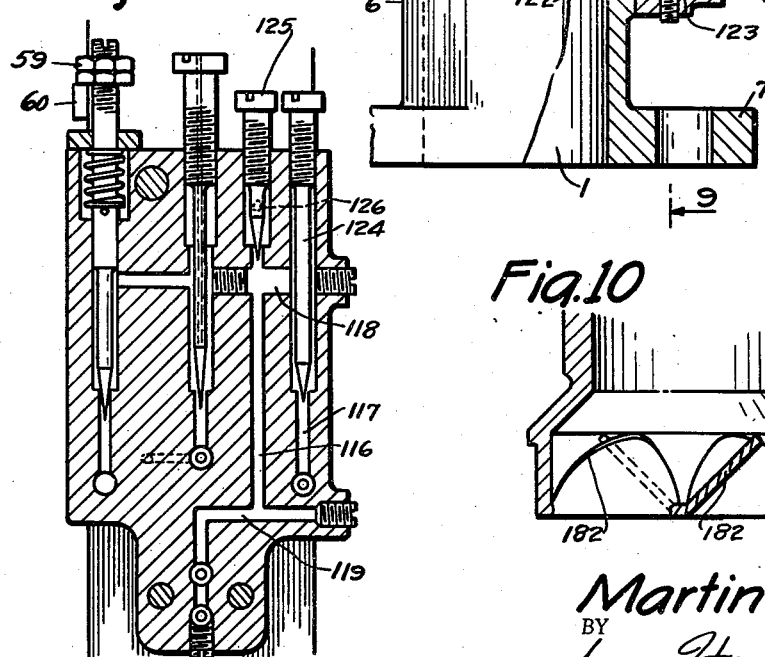
Fig. 9
Fig. 10
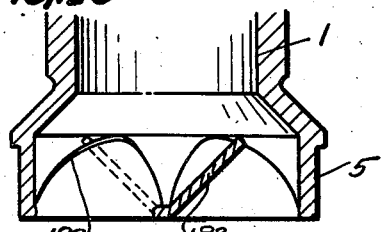
INVENTOR.
Martin Winter
BY
James Harrison Bowen
ATTORNEY.

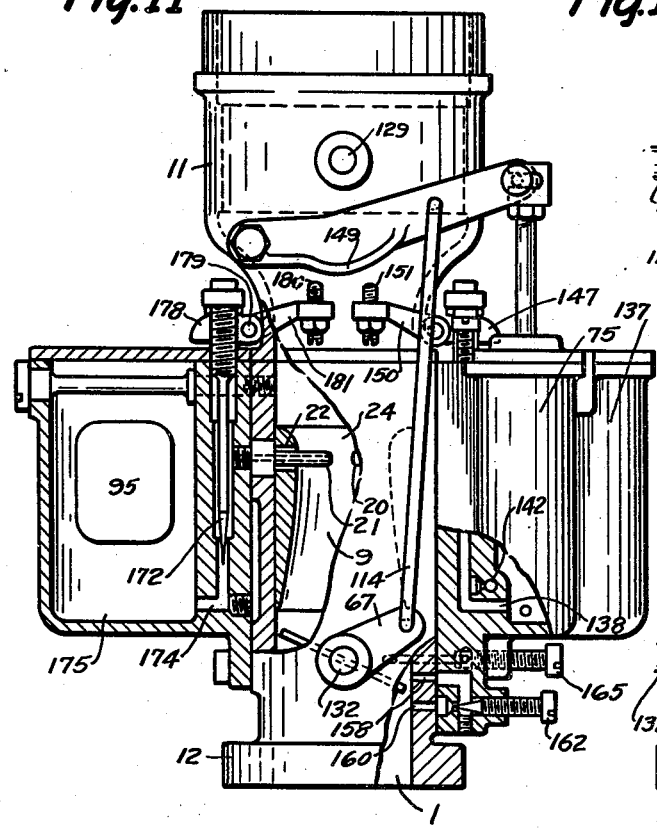

April 13, 1937.  M. WINTER  2,076,606
CARBURETOR
Filed Nov. 13, 1934   6 Sheets-Sheet 5
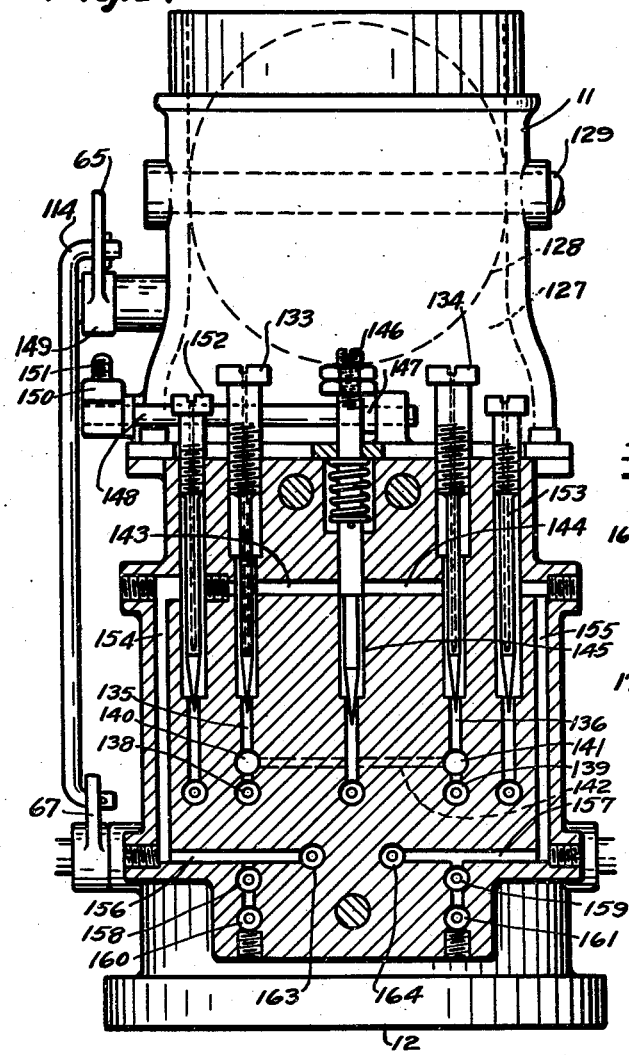
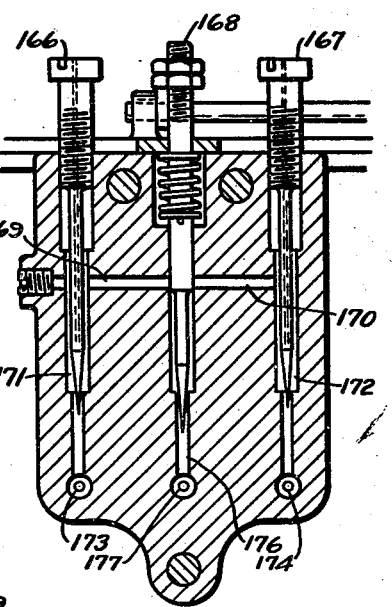
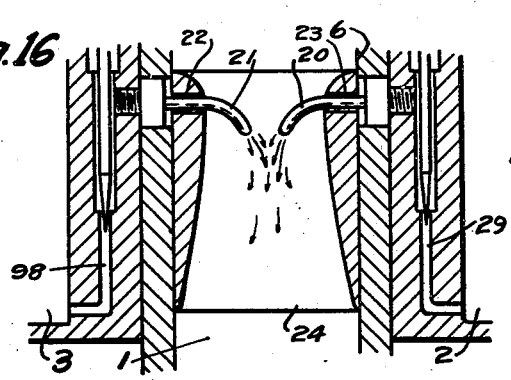
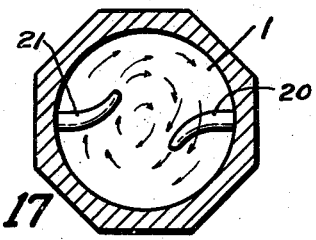
INVENTOR.
Martin Winter
BY James Harrison Bowen
ATTORNEY.

April 13, 1937.　　　M. WINTER　　　2,076,606
CARBURETOR
Filed Nov. 13, 1934　　　6 Sheets-Sheet 6
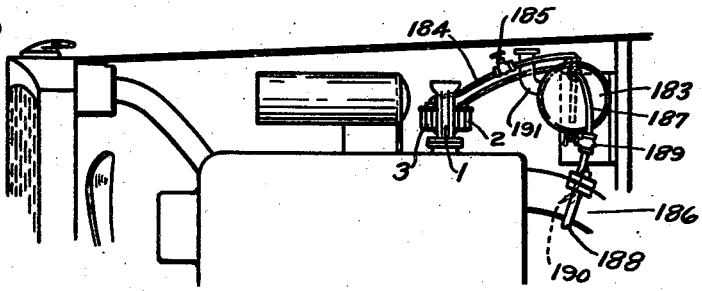
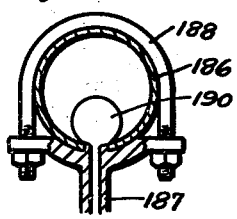
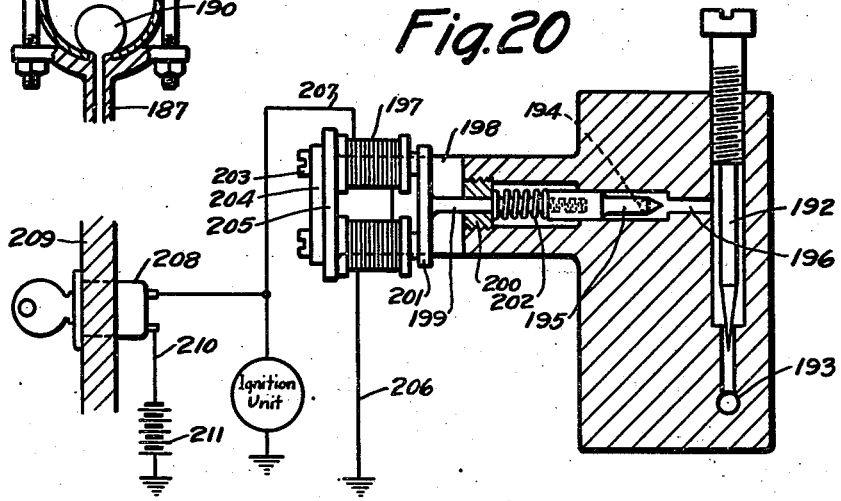
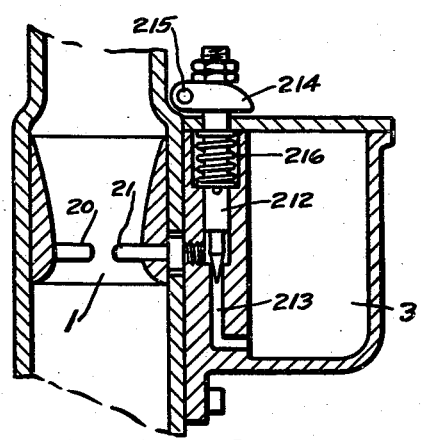
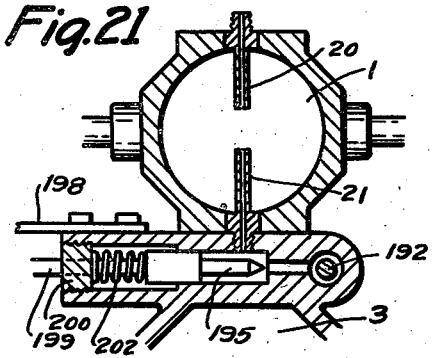
INVENTOR.
Martin Winter
BY
James Harrison Bowen
ATTORNEY.

Patented Apr. 13, 1937

2,076,606

UNITED STATES PATENT OFFICE 2,076,606

CARBURETOR

Martin Winter, New York, N. Y.

Application November 13, 1934, Serial No. 752,859

5 Claims. (Cl. 261—18)

The purpose of this invention is to provide improvements in carburetors of the type used for volatilizing a plurality of fluids for internal combustion engines and the like in which a cool, dense mixture is provided, carbon deposits substantially eliminated, and in which the radiator and water jackets may be eliminated; by providing auxiliary means for automatically supplying additional fuel as the throttle approaches the "full open" position, by more thoroughly mixing the fluids, and also by providing additional adjustments for readily changing the mixture to compensate for different conditions.

The invention relates to improvements over the prior co-pending applications with the Serial Numbers 732,752 and 739,722, of myself and Vito D'Amato, in that I have added additional connections and valves for supplying extra amounts of water and gasolene with means automatically opening said valves, an improved venturi, an additional auxiliary port for supplying fuel for idling and at low speeds, and have changed the position of the inlet nozzles to improve the mechanical mixing of the fluids, and have also improved the general construction and arrangement of the carburetor and the respective parts thereof.

The object of this invention is to provide a complete carburetor of the type used for mixing a plurality of fluids and air in which devices are provided to compensate for all conditions, thereby supplying the best possible mixture and at the same time saving gasolene.

Another object is to provide a carburetor with auxiliary fuel supply inlets for providing fuel in addition to that normally used, for high speeds or heavy duty, and means automatically operating said auxiliary supply.

Another object is to provide an improvement in carburetors of the type supplying a plurality of fluids in combination with air, in which the fluid supplying means are readily adjusted to admit different amounts of fluids from the exterior.

Another object is to provide an improvement in carburetors of the type used for supplying a plurality of fluids, in which the fuel inlet means are positioned to obtain the best possible mixing of the fluids.

Another object is to provide an improvement in carburetors for mixing gasolene, water and air, in which twin fuel mixing means is provided, so that the carburetor is adapted for internal combustion engines having two manifolds, such as are normally used with engines of the V type.

Another object is to provide improved means in a carburetor of the type used for mixing water and gasolene, for forcing an additional amount of gasolene thru the carburetor when the throttle is moved toward the "full open" position with a comparatively quick movement.

Another object is to provide a carburetor, or fuel-mixer supplying a cool, dense mixture.

A further object is to provide a carburetor which makes it possible to eliminate the radiator and water jackets of internal combustion engines.

With these ends in view, the invention embodies a carburetor having a mixing chamber with a contracted intermediate portion and with butterfly valves adjacent the ends, water and gasolene supply chambers in combination with said mixing chamber, and having fuel supply connections with regulating means therein communicating therewith, a fuel supply pump automatically operated by a relatively quick movement of the throttle valve, connections from the gasolene container to points above and below the edge of the butterfly valve adjacent the outlet end of said mixing chamber, with the valve substantially closed, providing fuel compensating means, auxiliary fuel supply connections adapted to supply additional fuel to said nozzles at extreme loads, means automatically operating valves in said auxiliary fuel supply connections, means automatically shutting off the fluids before entering the mixing chamber as the engine is shut off, and float valves in said gasolene and water supply chambers automatically regulating the amounts of fluids admitted thereto.

Other features and advantages of the invention will appear from the following description, taken in connection with the drawings, wherein:

Figure 5 is a cross section thru the carburetor showing the gasolene and water supply valves and passages normally used for ordinary operation of the engine.

Figure 6 is a cross section thru one of the fuel supply chambers for the up or down draft carburetor shown in Figures 1 and 6, showing the arrangement of the float valve.

Figure 7 is a similar section thru one of the fluid supply chambers of the carburetor shown in Figure 8.

Figure 8 is a view showing a front elevation of a carburetor of the down draft type with parts broken away showing the normal and compensating fuel supply connections.

Figure 9 is a section on line 9—9 of Figure 8 with parts broken away, showing the gasolene supply and compensating connections in a carburetor of the down draft type.

Figure 10 is a view showing an alternate arrangement providing vanes in the inlet end of the mixing chamber to increase turbulence.

Figure 11 is a side elevation of a twin type of carburetor with parts broken away, showing the position of the normal water supply valves.

Figure 12 is a cross section thru the carburetor shown in Figure 11.

Figure 13 is a plan view of the twin carburetor shown in Figure 11, taken just below the bell at the top.

Figure 14 is a cross section on line 14—14 of Figure 13 showing the gasolene supply valves and passages of a carburetor of the twin type.

Figure 15 is a similar section on line 15—15 of Figure 13, showing the water supply valves and passages in the drawings.

Figure 16 is a detail showing an alternate position of the gasolene and water inlet nozzles.

Figure 17 is a detail showing an alternate arrangement of the fuel and water nozzles, in which the tips of the nozzles are curved to provide turbulence.

Figure 18 is a detail showing the general arrangement in which a water supply tank for providing water to the carburetor is provided with a connection to the exhaust manifold to utilize the pressure of the exhaust for forcing the water to the carburetor.

Figure 19 is a detail showing a cross section thru the connection of the pipe extending to the water tank at the exhaust pipe.

Figure 20 is a detail showing an alternate arrangement in which an automatic electrically operated valve is provided for shutting off the water or fuel just before it enters the nozzle when the engine is shut off.

Figure 21 is a plan view showing a section thru the valve shown in Figure 20.

Figure 22 is a detail showing another alternate arrangement in which mechanical means is provided for opening a valve in the water or fuel supply as the engine is turned on, and which will automatically shut off said water or fuel as soon as the engine is shut off.

Figure 1:
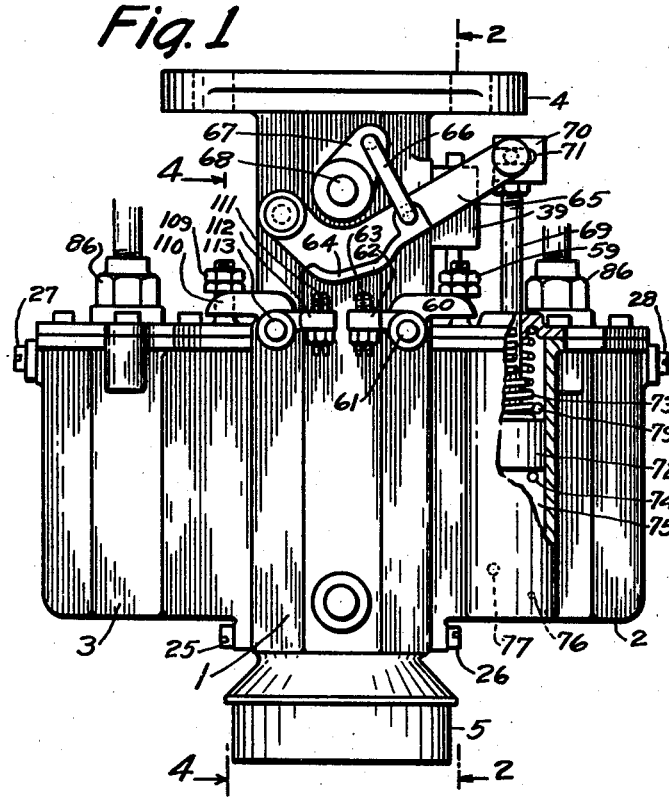
Figure 1 is a view showing a front elevation of a carburetor of the down draft type, and with part broken away, showing the fuel force pump.

In the drawings the device is shown as it may be made wherein numeral 1 indicates the mixing chamber, which is shown as positioned between the fuel and water chambers, however, it will be understood that the device may be constructed with this chamber, or with the side chambers, in any position in relation to each other, as both of the side chambers may be on the same side, or in front or in back of the chamber 1, which is described as the mixing chamber. Numeral 2 refers to the gasolene supply chamber, and numeral 3 the water supply chamber.

In the co-pending applications, the mixing chamber 1 has been shown square, round, and also of a rectangular shape, however, it is preferred to use the round or cylindrical shape on the interior, as the valves may be more readily fitted and adjusted to this shape. In the design shown in Figure 1, this mixing chamber is formed with an octagonal outer surface, however, it will be understood that this may be made cylindrical, or of any shape. In this design, this chamber is formed with a carburetor flange 4 at the upper end and with a bell 5 at the lower end, which provides a slightly enlarged entrance, so that air, as it passes upward into the mixing chamber, will be contracted as it enters the interior of the chamber.

It will be understood that the carburetor shown in Figures 1 to 5 is of the up draft type, however, it may also be made for a down draft, as shown in Figure 8, in which it is indicated by the numeral 6, and in this design a carburetor flange 7 is provided at the lower end and a bell shaped portion 8 is provided at the top.

This mixing chamber may also be made in a double casing, as shown in Figures 11 and 12, in which it is provided with two mixing chambers 9 and 10, and the upper or inlet end is enlarged, as shown at 11, and the lower end is provided with a flange 12, by which it may be connected to the intake manifolds of a twin engine. The carburetor shown in Figures 11, 12, and 13, is arranged for the down draft type, however, it will also be understood that this may be in reverse form so that it may also be used for the up draft type. It will be understood, therefore, that the mixing chamber or what might be considered as the central mixing chamber, may be provided in a casing of any type or design, and may be used for up or down draft, or may be made with a single chamber or with twin chambers, so that it may be used for an engine having one or two, or any number of intake manifolds.

In the design shown in Figures 1 to 5, the casing is provided for a carburetor of the up draft type and, in this design, it is provided with an upper butterfly valve 13 and a lower valve 14, and in a carburetor of this type, the upper valve 13 is connected to the throttle operating means of the engine so that it may be opened or closed to admit any amount of fuel desired to the intake manifold, and the lower butterfly or choke valve 14 is independently connected to a point on the instrument board or in the vehicle from where it may be manually operated, so that it is only adjusted when desired. It will be noted that in the design shown in Figure 8, the position of these valves is reversed, so that the lower valve 13 is connected to the operating means of a throttle, and the upper valve manually operated by independent means. The same is true of the design shown in Figures 11 and 12, as it will be noted that this is also a carburetor of the down draft type, and the lower butterfly valves are connected to the operating means of the throttle, and the upper valve independently operated. It will be understood that these valves may be of any type or design, and may be provided with any means by which they may be connected to the throttle operating means, or to any means in the vehicle by which they may readily be opened and closed. An arm 15 is shown on the shaft of the upper valve 13, and it will be understood that this may be connected to the throttle control means in any manner.

The mixing chamber 1 is provided with means positioned about midway thereof for reducing the area and thereby contracting the gases passing therethru, and then gradually expanding said gases, thereby providing a Venturi action inside of the mixing chamber, and the water and gasolene are supplied at this contracted point, so that the gases will have the highest possible velocity. In the design shown in Figure 5, this contracted area is formed by a sleeve 16, the lower end 17 of which is abruptly curved inward, whereas the upper portion gradually tapers outward toward the inner surface of the mixing chamber. This sleeve may be sweated or welded, or held in the mixing chamber in any manner or by any means, and the lower end may be provided with recesses 18 and 19, thru which the gasolene and water nozzles, as indicated by the numerals 20 and 21, may extend, and it will be understood that these recesses or openings may be of any shape or design, may be located at any point or points, and may be omitted, if desired. In the design shown in Figures 8 and 11, the position of the sleeve 16 is reversed, and it will be noted that in this design the sleeve is provided with openings 22 and 23, which pass thru the wall of the sleeve, which in this design is indicated by the numeral 24. The position of the sleeve may, therefore, be changed so that the abrupt curve at the large end 17 thereof will meet the incoming air.

The gasolene and water supply chambers 2 and 3 are attached to bosses on the sides of the mixing chamber 1 by bolts 25 and 26 at their lower ends, and 27 and 28 at their upper ends, so that they are readily removable, and it will be understood that these chambers may be mounted upon or attached to the mixing chamber by any means, or may be made integral therewith, and it will also be understood that they may be located in any position or positions thereon. These chambers may, therefore, be readily removed for cleaning, or for making adjustments, or for any purpose. In the design shown, these chambers are oppositely positioned, and are provided with connections to the nozzles 20 and 21, so that the fluid may be drawn from these chambers to the nozzles.

Figure 2:
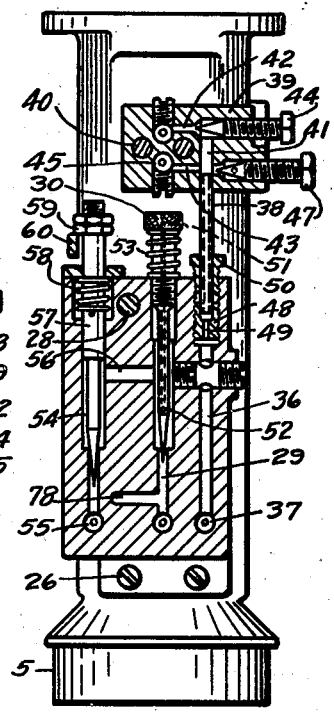
Figure 2 is a cross section on line 2—2 of Figure 1 showing the arrangement of the gasolene supply valves and compensating connections.
Figure 3:
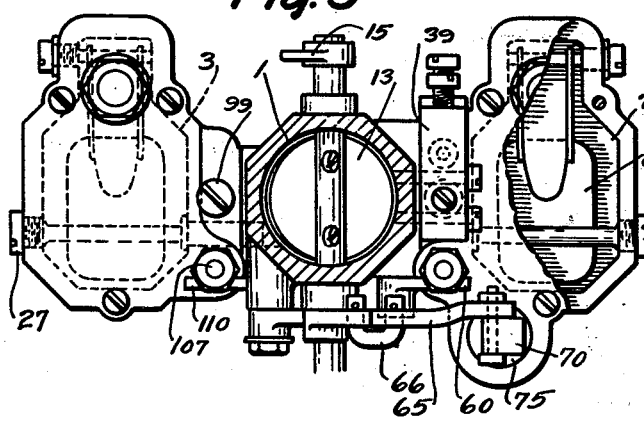
Figure 3 is a sectional plan taken thru the central chamber just below the connecting flange at the top, and with parts broken away showing the float in one of the supply chambers.

In the design shown in Figure 5, in which the section is taken thru the valves and connections for the normal supply of gasolene and water, the casing of the chamber 2 is provided with a vertical passage 29 having a valve 30 therein, and the lower end of this passage connects with the interior of the chamber thru an opening 31, and the end of this opening is provided with a restricting bushing 32 having a comparatively small opening 33 therein, and it will be noted that the nozzle 20, which extends thru an opening 34 in the casing of the mixing chamber 1, is threaded into the casing of the chamber 2, so that the opening therein will communicate with the vertical passage 29, and with the valve 30 partly open, the gas will then be free to pass from the chamber 2 thru the opening 33, the opening 31, the passage 29, and the nozzle 20. It will be noted that the fluid level of both the gasolene and water is substantially at the point 35, which is slightly below the nozzles 20 and 21, so that fluid will not pass out of the nozzles by gravity. The chamber 2 is also provided with a compensating fuel connection formed in a vertical passage 36, the lower end of which communicates with the lower end of the chamber 2 thru an opening 37, and the upper end of which is connected thru a tube 38 to a member 39, secured on the surface of the mixing chamber 1 by bolts 40, and the member 39 is provided with a vertical passage 41, an upper horizontal passage 42, and a lower horizontal passage 43. The upper horizontal passage 42 is provided with a valve 44, and the lower passage 43 communicates directly with the interior of the mixing chamber 1 thru a passage 45. It will be noted that the opening 45 is positioned slightly below the edge of the butterfly valve 13 with the valve substantially in the closed position. The member 39 is also provided with an auxiliary air connection, which opens into the mixing chamber 1 thru an opening 46, and is controlled by a valve 47, as shown in Figure 2. This opening also communicates with the vertical passage 41, and the amount of air passing therethru may be controlled by the valve 47. The lower end of the tube 38 is secured in the casing of the chamber 2 by a bushing 48 having a restricted opening 49 therein, and also a packing gland 50. It will also be noted that the stem of the valve 30 may be provided with a small opening 51 extending downward therein and opening into the passage 29 at the point 52, providing a bleeder for supplying a relatively small amount of air, and this valve may also be provided with a spring 53 to frictionally hold the valve member against the threads, providing locking means therefor.

The chamber 2 may also be provided with an auxiliary fuel supply connection formed by a vertical passage 54, which communicates with the interior of the chamber 2 by an opening 55, and which is also connected to the passage 29 by a cross passage 56. This connection is provided with a valve member 57 that is resiliently held downward to hold the valve in the closed position by a spring 58, and the upper end extends out of the upper part of the casing and is provided with nuts 59, which ride upon a cam member 60, mounted on a shaft 61, as shown in Figure 1. The cam member is provided with a projection 62 having a threaded stud 63 therein, which is positioned to be engaged by a cam surface 64 on a lever 65, and the lever 65 is connected by a link 66 to an arm 67 on the shaft 68 of the butterfly valve 13, so that as this valve is opened, it will move the lever 65 downward and the cam surface thereon will engage the stud 63, forcing the member 62 downward and raising the cam surface 60, which will raise the valve 57 thru the nuts 59, thereby opening the valve and permitting an additional supply of gasolene to pass thru the opening 54 and the cross connection 56, to the passage 29, and thereby into the mixing chamber 1 thru the nozzle 20. It will be understood that this is only one arrangement of an auxiliary fuel supply, and it will be understood that any means may be used for supplying additional fuel to the carburetor as the throttle approaches the full open position, such as may be required at high speeds or for pulling a heavy load up an incline. This auxiliary fuel supply connection may, however, be located at any point or points, may be of any type or design, and may be automatically operated in any manner. In this particular type of carburetor, it is operated in conjunction with a similar means for supplying additional water, however, it will be understood that it may be used independent of the water supply, and is, therefore, adapted for carburetors of any type or design.

This carburetor is also provided with a force pump for forcing an extra supply of fuel into the mixing chamber for acceleration, as when the throttle control is moved all the way open with a quick movement, the carburetor does not have sufficient time to pick up the extra amount of gasolene desired, and therefore a force pump is used to force an additional amount of fuel into the carburetor by pressure means.

In this design the pump is operated by the lever 65, and the outer end of the lever is pivotally attached to the upper end of the piston rod 69, thru a connection 70 having a slotted opening 71 therein, and on the lower end of the rod 69 is a piston 72, which is resiliently held downward by a spring 73. The piston is shown in the high position in Figure 1, and it will be noted that an opening 74 is provided just below the piston, which will admit gasolene from the chamber 2 to the pump cylinder 75, and the lower end of the cylinder 75 is provided with a small restricted opening 76, thru which gasolene may pass back into the chamber 2, and also with an opening 77 communicating with a cross opening 78, which is substantially larger than the opening 76, so that the main amount of gasolene in the cylinder 75 will pass thru the connection 78 and into the passage 29, from which it will immediately pass into the mixing chamber 1 thru the nozzle 20. The upper part of the cylinder 75 may also be provided with an overflow connection 79, thru which fluid leaking by the piston may pass back into the upper part of the chamber 2.

The chambers 2 and 3 are provided with floats 80, and in the design shown in Figures 1 and 5, these floats are mounted as shown in Figure 6, in which they are connected to an arm 81, which is pivotally mounted on a pin 82, and the arm 81 is provided with a member 83, which engages the lower end of a valve stem 84 of a valve 85, in a valve body 86. The valve body is threaded into a boss 87, extending upward from a cover plate 88, which may be provided on the chambers 2 and 3, and may be held by screws 89, or arranged in any manner. Supply tubes, as shown in Figure 1, may be connected to the valve bodies 86, and these may extend to gasolene and water supply tanks, or to the vacuum tank, or to any means for supplying water or gasolene, or other fuel.

In the design shown in Figure 7, the inlet valves are oppositely positioned, and the supply connections may be threaded into bosses 90 in the lower ends of the chambers, and valve bodies 91 threaded into the inside, as shown. Valve members 92 are slidable in the upper ends of the members 91, and these are moved upward and downward by projections 93 on arms 94, extending from floats 95, in which the arms 94 are pivotally mounted on pins 96. The chambers in this design are provided with cover plates 97, which may also be bolted or secured to the containers in any manner, or by any means. It will also be understood that any other means may be used for controlling the valves by the float members, and valves of any other type or description may be used.

The water chamber 3 is similar to the chamber 2, and this is also bolted to the side of the mixing chamber 1 in a similar manner, and provided with a member 86, which may be connected to a water tank, as shown in Figure 18, or to any means for supplying water. This chamber is provided with a vertical passage 98, having a valve 99 therein, and this valve is also provided with an internal opening 100, similar to the valve 30, and the lower end of the passage 98 is connected to the interior of the chamber 3 by a cross connection 101. This cross connection is not shown as provided with a restricted member, similar to the member 32, as this member is not required for water, however, it will be understood that a restricting member may be used in this connection, if desired. The passage 98 communicates with the nozzle 21, which is positioned in an opening 102 in the side of the mixing chamber 1, similar to the nozzle 20. In the design shown in Figure 4, the upper end of the valve 99 is provided with a spring 103, similar to the spring 50, shown on the valve 30 in Figure 2, however, it will be understood that this spring may or may not be used, as may be desired. The water chamber 3 is also provided with an auxiliary water supply connection 104, similar to the connection 54, and the lower end of this connection is provided with a cross connection 105, which extends into the water chamber 3. The upper part communicates with the passage 98 of the valve 99, thru a cross connection 106, and this supply of water is controlled by a valve 107, which is resiliently held in the closed position by a spring 108. The upper end of the valve stem is provided with nuts 109, which may be engaged by a cam member 110 to move the nuts and valve upward to open the valve when the throttle control is moved toward the full open position, and the operation of this valve member 110 is similar to that of the valve member 60, as it is operated by the same lever 65, the cam surface 64 of which engages a stud 111 in an extension 112 of the cam 110, which is pivotally mounted on a pin 113, as it will be noted that as the cam surface 64 moves downward, it engages the stud 111, moving the extension 112 downward, and the extension 110 upward, thereby opening the valve and permitting an additional supply of the water to pass into the mixing chamber 1 when the throttle approaches the full open position.

It will be understood that the cam surface 64 may be shaped to open the auxiliary gasolene and water supply valves for exactly the same amount, or different amounts, so that the proportions of the gasolene and water may be varied, as more gasolene may be admitted, or more water may be admitted, and these amounts may be further adjusted by the studs 63 and 111, as may be desired.

These valves are operated exactly in the same manner in the inverted or down draft carburetor, shown in Figure 8, except that the arm 67 is located on the lower butterfly valve shaft and connected to the arm 65 by a link 114, which is somewhat longer than the link 66. The operation and relative positions of the valves are exactly the same in both designs, except that the compensating fuel supply connection in the member 39 is positioned at the lower end of the casing.

In the design shown in Figures 8 and 9, the compensating fuel supply connection is provided in an extension 115, and the casing of the chamber 2 is provided with an additional passage 116, which communicates with a passage 117 that is similar to the passage 36, thru a cross connection 118, and the lower end of the passage 116 extends across thru an opening 119 to a vertical passage 120, the lower portion of which is connected to an opening 121, positioned on one side of the butterfly valve 13 and also thru another connection 122, which is provided with a valve 123, so that the area thereof may readily be adjusted. In this design, the passage 117 is provided with a valve 124, so that the amount of fuel passing therethru may also be adjusted, and the upper end of the passage 116 is also provided with a valve 125, which provides a connection thru an air opening 126, which communicates with the interior of the mixing chamber 1. It will also be understood that these valves and their respective connections may be of any type and may be formed in any manner.

In the design shown in Figures 11 and 12, the device is shown with double mixing chambers 9 and 10 communicating with a common bell chamber 127 having a butterfly valve 128 therein, and this is pivotally mounted on a shaft 129, which may be connected to any manual means by which it may be operated. The lower part of this casing is formed with two chambers, and butterfly valves 130 and 131 are positioned in the lower ends of these chambers, however, these valves are operated on a common shaft 132 on the end of which an arm 67 may be placed which may be connected to the lever 65 thru a link similar to the link 66, or in the design shown similar to the link 114, and these valves may be operated by the throttle control to which the shaft 132 may be connected by the arm 15. The shaft and arrangement of the interior part of the casing is substantially the same, and each section is provided with a sleeve 24, forming the venturi or restricted area, and the nozzles enter the chamber thru these sleeves.

Figure 4:
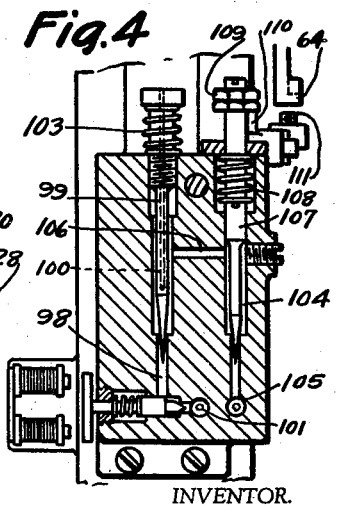
Figure 4 is a cross section on line 4—4 of Figure 1 showing the water supply valves, with alternate closing means.

The valves are also similar to the valves shown in Figures 2 and 4, however, it will be noted that these valves are arranged in pairs, and only one valve is provided for the additional supply of gasolene or water.

Figure 14 shows the arrangement of the gasolene valves, and it will be noted that the normal gasolene supply is provided thru the valves 133 and 134 in the passages 135 and 136. The lower ends of these passages extend into the gasolene supply container 137, similar to the container 2, through cross connections 138 and 139. These passages may also be provided with openings 140 and 141, which connect with a cross connection 142, which extends to the pump cylinder 75 positioned at one end of the chamber 137. The nozzles 20 extend into the upper portions of the passages 135 and 136, as shown in Figure 8, and these openings are connected by cross passages 143 and 144 to the auxiliary gasolene supply passage 145, having a valve 146 therein which may be raised by a cam member 147, similar to the cam 60, positioned on a shaft 148 and operated by a cam surface 149, similar to the cam surface 64, thru an arm 150 having a stud 151 therein, similar to the stud 63. This valve 146 is, therefore, opened in a similar manner to the valve 57, which controls the auxiliary gasolene supply in the design shown in Figure 1, and it will be noted that as this valve is opened it will supply additional gasolene thru the connections 143 and 144 to both of the nozzles 20 in the chambers 9 and 10. The valve 146 is normally closed, thereby shutting off the cross connections 143 and 144 so that the adjustments of the normal fuel supply will not be disturbed by these connections.

Compensating gasolene supply valves which, in this design, are indicated by the numerals 152 and 153, are positioned at each side and connected into passages 154 and 155, which extend downward to the cross connections 156 and 157, and these connections communicate with the openings 158 and 159 above the butterfly valves, and 160 and 161 below the butterfly valves, which connections supply gasolene similar to the connections 42 and 45 in the design shown in Figure 5, so that gasolene may be supplied beyond the butterfly valve for idling when the valve is substantially closed, and also so that additional gasolene may be provided when the valve is first opened. The lower connections 160 and 161 may be provided with valves 162, by which the amount of gas passing therethru may be adjusted, and it will be noted that the cross connections 156 and 157 extend into the interior of the chambers 9 and 10 thru openings 163 and 164, so that air may pass into these connections, and these connections may also be provided with valves, as indicated by the numeral 165, so that the amount of air passing therethru may be regulated.

The water connections are also similar, except that they are duplicated for the twin type of carburetor, and it will be noted in Figure 15 that the device is provided with two valves 166 and 167 for providing the normal supply of water, and an additional water supply valve 168 which, in the design shown, is positioned between the supply valves 166 and 167, and connected by cross passages 169 and 170 to the vertical passages 171 and 172 of these valves. The lower ends of the passages 171 and 172 are connected by cross channels 173 and 174 to the interior of the water supply chamber 175, which is similar to the chamber 3, except that it is somewhat larger, and it will be noted that the passage 176, in which the valve 168 is located, is also provided with a cross channel 177, which extends into the chamber 175. The valve 168 is also raised by a cam 178, similar to the cam 110, and this cam is mounted on a shaft 179, similar to the shaft 148, and operated by the cam surface 149 thru a stud 180 and an arm 181. The movement of these cams may also be adjusted thru the studs and cam surfaces, so that equal amounts of water and gasolene may be admitted to the mixing chambers, or so that these amounts may be adjusted in order to obtain the proportions of the fluids desired.

Figure 10 shows a detail thru the bell at one end of the mixing chamber, and in this design the bell is provided with vanes 182, which will have a tendency to give air passing upward into the device turbulence in order to improve the mixture, and it will be appreciated that these vanes may be of any shape or design, may be located in any position or positions, and also that many other means may be used for imparting turbulence to the air passing thru the mixing chamber or for assisting mixing of the water, gasolene and air in order to insure a comparatively volatilized mixture.

Figure 16 shows the mixing nozzles 20 and 21 sloping downward, and it will be understood that these nozzles may slope upward or downward, or at any angle, and may be provided in any position to obtain the best possible mixing of the two fluids as they enter the mixing chamber. The tips of the nozzles may also be curved, as shown in Figure 17, or shaped in any manner to provide turbulence or more efficient mixing.

In the design shown in Figure 18, the device is shown connected to a motor vehicle engine, and in this design the water supply container 2 is connected to a water tank 183 thru a connection 184 having a valve 185 therein, and the tank is connected to the exhaust 186 of the engine by a tube 187, as shown. The tube 187 may be held against the exhaust pipe 186 by a U bolt 188, as shown in Figure 18, or by any means. This connection may also be formed in any other manner in which the pressure of the exhaust gases may be conveyed to the water tank in order to hold the water therein under pressure. The connection 187 may be provided with a valve 189, which may be of any type or design, and this connection may also include a spoon 190, which may extend into the exhaust pipe, as indicated by the dotted lines shown in Figure 18. The tank 183 may also be provided with a vent 191, which may be arranged in any manner. It will be noted that connecting the exhaust gases to the water tank makes it possible to provide a slight pressure on the water, so that it will flow freely to the water supply container 3, as in the twin type of engine, or in any engine where the carburetor is positioned on the top thereof, it will be substantially impossible to locate the water tank above the carburetor so that water may flow thereto by gravity.

This device is also provided with means for instantly shutting off the fluids just before they enter the mixing chamber automatically when the engine is shut off, and this may be accomplished by connecting the shut off valve operating means in the ignition circuit of the engine, or by closing the shut off valves when the throttle control is released or operated to the shut off position.

Figure 20 shows a typical arrangement in which the water valve 192 is positioned toward one side with the supply connection 193 to the container 3 at the lower end, and the connection 194 to the nozzle 21, shown in dotted lines, behind a shut off valve 195 in a passage 196. The valve 195 is controlled by solenoids 197 in a frame 198, and a rod 199, attached to the end of the valve, is slidable in a bushing 200, and the outer end is provided with a cross bar 201, which is positioned to be influenced by the magnetism of the solenoids, so that when the solenoids are energized, it will draw the valve open, and with the solenoids connected in the ignition circuit of the engine so that they will be energized all the time the engine is turned on, this valve will be held open, whereas just as soon as the engine is turned off, the bar 201 will be released and the spring 202 will instantly close the valve, thereby shutting off the supply of water from the water container to the nozzle. The solenoids may be positioned at one side of the carburetor or mixing device, and these may be held on the bracket 198 by screws 203 in a flange 204, from which they may be insulated by a member 205. It will be understood that these solenoids may be mounted in any manner, or may be located at any position, or at any point or points, and any means may be used for operating the valve by the solenoids. It will also be understood that the valve 195 may be located at any point or points in the water supply, so that it will instantly and automatically shut off the water supply just as soon as the engine is shut off, thereby preventing the water being injected into, or entering, the mixing chamber of the carburetor, or the manifold, or the engine cylinders, so that no moisture whatever may pass into any of these parts after the ignition is shut off. It will be appreciated that moisture passing into the engine after the explosions of the combustion chambers have ceased, may cause rust or corrosion. It will also be understood that a similar valve may be used in the gasolene supply, so that the gasolene may also be instantly shut off as soon as the ignition is turned off and, furthermore, it will be appreciated that this device may be used on carburetors of any other type, or in which any kind of fuel is used. This device may also be provided as shown in Figure 4, in which the valve is positioned at the lower end of the connection to the fluid supply containers.

One side of the solenoid 197 may be grounded thru a wire 206, and the other connected by a wire 207 to the key switch 208 on the instrument board, which is indicated by the numeral 209, the opposite terminal of which may be grounded thru a wire 210 and a battery 211. It will be understood, however, that this connection may be made at any other point, or the solenoid may be connected in the ignition circuit in any other manner.

In the design shown in Figure 22, the water shut off is accomplished by a valve 212 in a passage 213 between the water supply chamber 23 and the nozzle 21, and it will be noted that this valve is operated by a cam 214 on a shaft 215, and this cam is arranged similar to the cams 147 and 178, and positioned so that as soon as the throttle control is operated, it will raise instantly, and raise and open the valve 212, however, just as soon as the throttle control is completely released so that the engine is shut off, this valve will be instantly closed by a spring 216. It will also be understood that this valve may be mechanically operated by any other means, and may be positioned at any other point or points, and may also be used in either the water, gasolene, or other fuel or fluid supply.

It will be understood that other changes may be made in the construction without departing from the spirit of the invention. One of which changes may be in the use of valves of any other type or design, another may be in the use of other means for connecting the valves to the containers and mixing chamber, another may be in the use of other means for operating the valves, and still another may be in the use of other means for conveying the gasolene and water into the mixing chamber, or in the use of other means for atomizing or volatilizing the fluids. It will also be understood that, altho this device has been shown and described as adapted to use gasolene and water, any other fluids may be used, and it may be used for any other purpose.

The construction will readily be understood from the foregoing description. In use the carburetor may be attached to the carburetor flange of the intake manifold of an internal combustion engine, and the butterfly valve at the outlet end of the central mixing chamber connected to the regular throttle valve connection, or foot lever. The butterfly valve at the inlet end of said mixing chamber may be connected to an independent operating lever, or any means by which it may be independently operated, and with these connections made and the valves properly adjusted, the carburetor will function in the normal manner, and the gasolene and water will be automatically mixed with air as it is drawn upward thru the mixing chamber, and the complete mixture will be drawn into the intake manifold. The suction of the manifold will draw gasolene and water thru the nozzles projecting into the restricted area of the mixing chamber, and it will be noted that these nozzles are oppositely positioned, so that the gasolene and water will be drawn against each other, thereby effecting the best possible atomizing and mixing. It will be understood, however, that these nozzles may be positioned to draw gases and water upward or downward, or in any direction. It will also be understood that any mechanical mixing means may be used to thoroughly mix or atomize the gases and water, and this mixture is drawn into the intake manifold and into the respective engine cylinders. This mixture is drawn into the cylinder with the downward stroke of the piston which, as soon as the intake valve closes, creates a partial vacuum, which liberates the atoms of the mixture and this, in combination with the heat of the cylinder, it is believed, partially breaks down the water, so that with the upward compression stroke and instant explosion with the resulting compression and temperature thereof will make it possible for the water molecules and vapors of the gasolene to produce the greatest possible pressure, and thereby make it possible to obtain the highest possible efficiency. Mixing water with gasolene in the carburetor and substantially volatilizing these fluids produces a cool, dense mixture which, when injected into the intake manifold of cylinders of an internal combustion engine, materially reduces the temperature of the engine block, thereby making it possible to operate the engine at a comparatively low temperature which, therefore, makes it possible to eliminate the water jacket and radiator. Such a mixture also substantially eliminates all carbon deposits around the cylinders, manifolds and valves, thereby practically eliminating regrinding of valves and all cleaning operations ordinarily required to remove carbon deposits.

Having thus fully described the invention, what I claim as new and desire to secure by Letters Patent, is:

1. In a carburetor of the type used for internal combustion engines, a vertical tubular mixing chamber, reservoirs positioned at each side of said tubular chamber, inlet connections from said reservoirs to said vertical chamber, means in said inlet connections controlling the amount of fluids passing into said mixing chamber, an auxiliary connection from one of said reservoirs to the outlet end of said mixing chamber, secondary connections from said reservoirs to said mixing chamber, nozzles extending into said mixing chamber from the opposite sides thereof, said nozzles communicating with both the inlet and secondary connections from the reservoirs, means in said secondary connections for controlling the flow of fluids therethrough, and cross-communicating passages between the said inlet connections from the reservoir to the mixing chamber and also said secondary connections.

2. A carburetor as described in claim 1 characterized by a secondary connection from said auxiliary connection to a point on the opposite side of the air control means from that on which the auxiliary connection opens into the mixing chamber.

3. A carburetor as described in claim 1, characterized by air control valves at the opposite ends of said mixing chamber, means opening and closing said valves simultaneously, and means opening the fluid control means in the connections from the reservoirs to the nozzles, operated by the air control operating means, and further characterized by a secondary opening in said auxiliary connection, said secondary opening positioned on the opposite side of the air control means from that on which the outlet of the auxiliary connection is positioned.

4. A carburetor as described in claim 1 further characterized by secondary vertical passages communicating with the reservoirs and nozzles, with valves in said passages, and also auxiliary passages to points adjacent the outlet end of said mixing chamber, and still further characterized by secondary outlets in said auxiliary connections positioned on the opposite side of the air control means from that on which the auxiliary connections enter the mixing chamber.

5. A carburetor as described in claim 1 further characterized by secondary vertical passages communicating with the reservoirs and nozzles, with valves in said passages, and also auxiliary passages to points adjacent the outlet end of said mixing chamber, and still further characterized by secondary outlets in said auxiliary connections positioned on the opposite side of the air control means from that on which the auxiliary connections enter the mixing chamber, said secondary openings from the auxiliary connections having valves therein.

MARTIN WINTER.